United States Patent
Venkatesh et al.

(10) Patent No.: US 11,068,193 B2
(45) Date of Patent: Jul. 20, 2021

(54) MAPPING DATA SOURCES TO STORAGE DEVICES BASED ON FUZZY LOGIC-BASED CLASSIFICATIONS

(71) Applicant: ENTIT SOFTWARE LLC, Sanford, NC (US)

(72) Inventors: Lokesh Murthy Venkatesh, Bangalore (IN); Nandan Shantharaj, Bangalore (IN); Sunil Turakani, Bangalore (IN)

(73) Assignee: Micro Focus LLC, Santa Clara, CA (US)

( * ) Notice: Subject to any disclaimer, the term of this patent is extended or adjusted under 35 U.S.C. 154(b) by 94 days.

(21) Appl. No.: 16/431,528

(22) Filed: Jun. 4, 2019

(65) Prior Publication Data
US 2020/0050372 A1 Feb. 13, 2020

(30) Foreign Application Priority Data
Aug. 9, 2018 (IN) .............. 201841030037

(51) Int. Cl.
*G06F 3/06* (2006.01)
*G06F 11/14* (2006.01)
*G06N 7/02* (2006.01)

(52) U.S. Cl.
CPC ............ *G06F 3/065* (2013.01); *G06F 3/0608* (2013.01); *G06F 3/0631* (2013.01); *G06F 3/0683* (2013.01); *G06F 11/1458* (2013.01); *G06N 7/026* (2013.01)

(58) Field of Classification Search
None
See application file for complete search history.

(56) References Cited

U.S. PATENT DOCUMENTS

| | | | |
|---|---|---|---|
| 7,082,505 B2 | 7/2006 | Chen | |
| 7,930,265 B2 | 4/2011 | Akelbein et al. | |
| 8,769,055 B2 | 7/2014 | Murphy et al. | |
| 2012/0117029 A1 | 5/2012 | Gold | |
| 2015/0286701 A1 | 10/2015 | Wideman | |
| 2017/0011049 A1* | 1/2017 | Venkatesh | G06F 16/174 |
| 2017/0262216 A1 | 9/2017 | Polkovnikov et al. | |

FOREIGN PATENT DOCUMENTS

TW 583558 4/2004

OTHER PUBLICATIONS

Lowe, Scott; "The Enterprise Cloud—Calculate IOPS in a storage array"; TechRepublic; www.techrepublic.com/blog/the-enterprise-cloud/calculate-iops-in-a-storage-array/; Feb. 12, 2010; 11 pp.

Niu, et al; Online Fuzzy Logic Control with Decision Tree for Improving Hybrid Cache Performance & Symposia; 12th IEEE International Conference on Control & Automation (ICCA) ; Jun. 1-3, 2016, 6 pp.

* cited by examiner

*Primary Examiner* — Charles J Choi

(57) ABSTRACT

A technique includes, for each storage device of a plurality of storage devices, applying, by a processor, fuzzy logic to assign the plurality of storage devices to respective storage classes based on the weights that are assigned to the plurality of storage devices. The technique includes assigning, by the processor, weights to attributes of a data source. In response to an operation to backup data of the data source, mapping, by the processor, the data source to a given storage device based on the weights that are assigned to the attributes of the data source and the storage class that is associated with the given storage device.

20 Claims, 6 Drawing Sheets

MAPPING DATA SOURCES TO STORAGE DEVICES BASED ON FUZZY LOGIC-BASED CLASSIFICATIONS

BACKGROUND

A computer network may have a backup and recovery system for purposes of restoring data on the network to a prior, consistent state should the data become corrupted, be overwritten, subject to a viral attack, etc. In this manner, the backup and recovery system may store backup data on various target storage devices, such as disks, virtual storage arrays, storage arrays, and so forth. An administrator for the backup and recovery system may create a backup policy that designates such information as backup schedules and the target storage devices to be used for particular source data.

DETAILED DESCRIPTION

Figure 1:
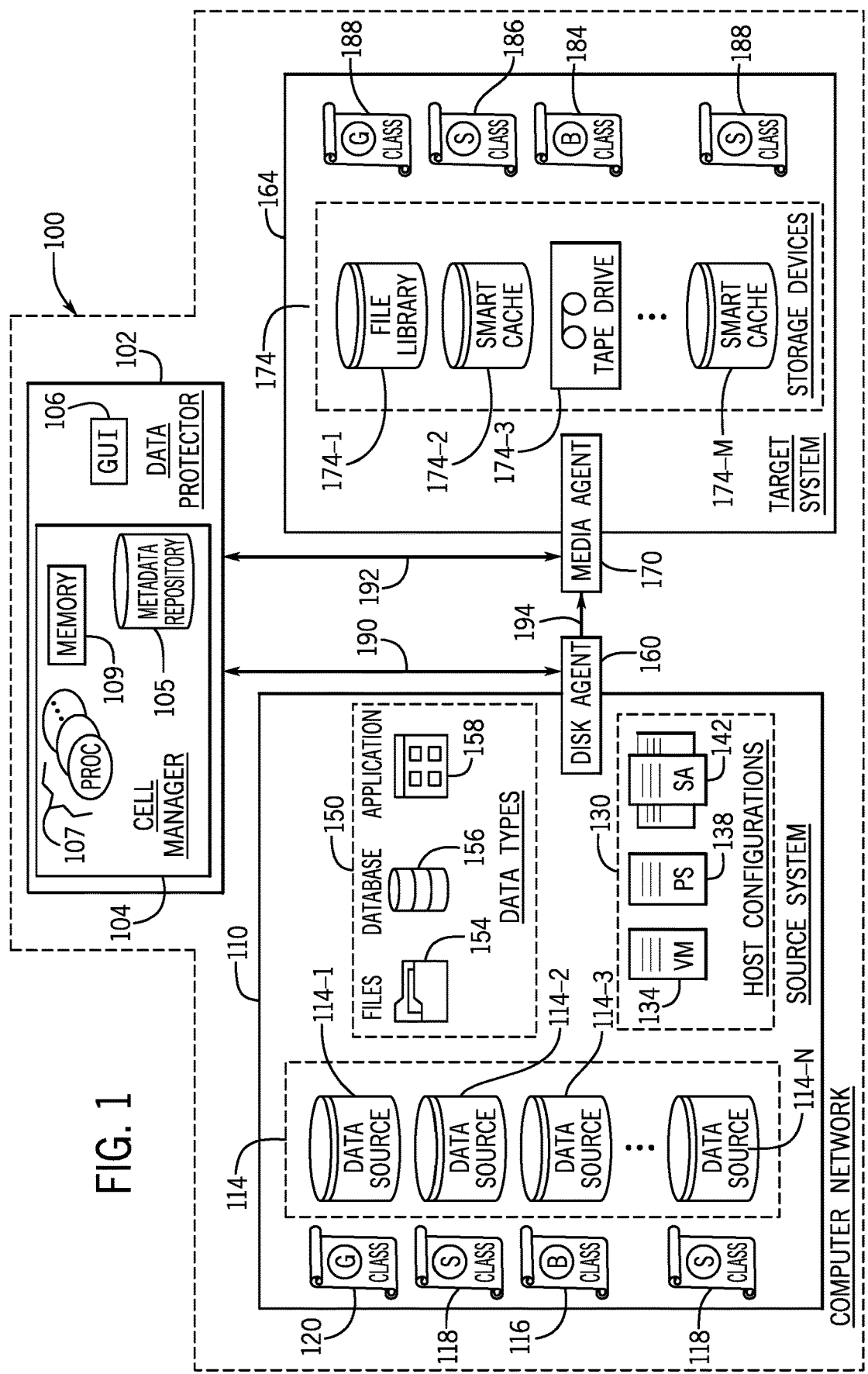
FIG. 1 is a schematic diagram of a computer network having a backup and recovery system according to an example implementation.

For purposes of backing up data for a particular data source, a human administrator may create a backup policy for the corresponding backup operations. In this context, a "data source" refers to a collection of data to be stored on one or multiple target storage devices as part of a backup operation for the collection of data. In general, the backup policy may specify such information as the collection of data corresponding to the data source, schedules for a backup operation, one or multiple target storage devices to which the backup data is transferred, and so forth.

The data source may have one or multiple attributes that characterize the data source. For example, the data source may be associated with a particular category, or class, called a "data type," such as a set of files, one or multiple database tables, a virtual machine (VM), one or multiple units of data stored in a logical store(s), and so forth. As an example of another attribute, the data source may have an associated device category, or type, which characterizes the physical device or devices used to store the data for the data source. For example, the data for the data source may be stored on a local, physical disk; may be stored in block storage as part of a logical unit of a storage array; may be part of a network file system (NFS), which is shared from another host; and so forth. As another example of an attribute, the data source may be associated with a particular host configuration, as the data for the data source may be stored on a standalone client, may be stored on a cluster, may be stored on a cluster with high availability, and so forth.

The target storage device(s), which store the backup data for the data source for a given backup operation may be selected from a pool, or group, of potential target storage devices. The particular target storage device(s) that are selected may be based on properties, or attributes, of the storage devices. As an example of an attribute for a storage device, the storage device may have an associated throughput. For example, a given storage device may be capable of operating at a particular operations per second (IOPS) rate, which may range from a lower limit (1, for example) to an upper limit (100,000, for example) based on the particular physical category, or type, of the storage device (whether the storage device is a hard disk drive, a tape, and so forth).

As another example of an attribute for a storage device, the storage device may have an associated deduplication ratio. In general, deduplication is used by a storage device to eliminate redundant blocks during the backup process. A given storage device may or may not support deduplication, and moreover, the particular deduplication ratio, if supported, may vary from one storage device to another. For example, the deduplication ratio for a set of target storage devices may vary from a lower limit (0, for example, to represent that the storage device does not support deduplication) to an upper limit (100, for example).

As an example of another attribute for a storage device, the storage device may be associated with a particular compression ratio. In general, data compression may be used by the storage device to reduce the storage space of the data that is stored on the storage device. The compression ratio may range from a lower limit (0, for example, to represent that the storage device does not support compression) to an upper limit (100, for example).

Another attribute that may characterize a particular storage device is the usage of the storage device. In this context, the "usage" of a storage device refers to the degree of "wear and tear" of the device, such as the number of hours that the device has been used, which generally increases over time. In this manner, the longer a particular storage device is in use, the higher the particular usage for the storage device (indicating a higher degree of wear and tear on the device).

One way to create a backup policy for backing up data for a particular data source is for the administrator to rely on the administrator's experience and knowledge in creating the backup policy. For example, in creating the backup policy for a given data source, the administrator may select the target storage device(s) for the data source based on attributes for the storage devices, which the administrator believes are compatible and consistent with the data source. For example, for one data source, the administrator may select tape drives to store the backup data, and for another data source, the administrator may select hard disk drives to store the backup data. As the device selection involves manual intervention by the administrator, the process may be error prone and relatively inefficient. The pairing of the data sources and target storage devices by the administrator may not fully take into account the aging of the storage devices, the data selected for the data source changing over time, and so forth. In general, the manual pairing may result in an incorrect or suboptimal target device being selected for a particular data source. Moreover, there is a possibility that human error may cause the source data to be backed up to an incorrect and/or inefficient storage device. The preservation of data and the availability of target storage devices may be important factors for data recovery for meeting such objectives as a Recovery Time Objective (RTO) and a Recovery Point Objective (RPO).

Incorrect selection or reselection of storage devices (due to storage device failure for other reasons) may result in rescheduled backup time. This rescheduling may result in the administrator editing the backup policy to accommodate the reason (to swap out a target device that has failed, for example). When such rescheduling occurs, the manual intervention by the human administrator may be prone to human error and may introduce significant delays, which may lead to a catastrophic result, such as backup data not being available should the data need to be restored.

In accordance with example implementations that are described herein, the process of selecting one or multiple target storage devices for a given data source for a backup operation is automated based on attributes of the data source and attributes of the available, candidate target storage devices. More specifically, in accordance with some implementations, a processor applies fuzzy logic to bucketize, or group, the data sources into corresponding categories, or classes, such as "gold," "silver," and "bronze." In a similar manner, in accordance with example implementations, the processor applies fuzzy logic, as described herein, to group the available, candidate storage devices into corresponding classes (such as, gold, silver and bronze) based on attributes of the storage devices. The automated classification of the data sources and storage devices into their respective classes allows the processor to, at the time of backup for a particular data source, identify a target storage device for the data source by selecting a target storage device that has been classified in the same group as the data source. For example, at the time of backup, the computer may, for a data source belonging to a silver class, select a target storage device to store backup data for the data source by selecting a target storage device from the silver class. As described herein, in accordance with example implementations, the selection of the target storage device(s) for a given data source may be dynamically determined, in that the processor may make the selection automatically in response to the initiation of the backup operation.

Moreover, the processor may dynamically determine whether changes have occurred to the data sources and/or storage devices during the backup operations (determine whether there have been changes to data source attributes, new files have been added to data source attributes, whether a storage device has failed, and so forth); and the processor may dynamically update the corresponding classifications of the data sources and storage devices during the backup operations. In this manner, in accordance with example implementations, the attribute information used by the processor to make the classifications of the data sources and target device(s) may be updated as the backup operations occur to allow the processor to dynamically change the classifications as warranted. For example, a particular data source may be associated with a certain database table or group of files, and the particular files/tables that are to be backed up may change over time. As another example, the storage devices may wear over time due to their usages, and correspondingly, a particular target storage device may be, for example, moved from the silver class to the bronze class due to the aging of the storage device. Moreover, a particular target storage device may fail, and as such, the processor may remove the storage device from its current class.

As a more specific example, FIG. 1 depicts a computer network 100 in accordance with some implementations. In general, in accordance with example implementations, the computer network 100 includes a backup and recovery system, which is represented by a source system 110, a disk agent 160 for the source system 110, a target system 164, a media agent 170 for the target system 164 and a data protector 102. The source system 110 contains data to be backed up pursuant to scheduled backup operations, and the target system 164 includes target storage devices to store the backup data and provide the backup data for recovery operations.

In general, the source system 110 may include data sources 114 (N example source devices 114-1, 114-2, 114-3 . . . 114-N, being depicted in FIG. 1), which may have varying compositions, as reflected by their properties, or attributes. For example, as depicted in FIG. 1, the data sources 114 may have different associated data categories, or types 150. In this manner, as illustrated in FIG. 1, the data types 150 may include, as examples, files 154, database tables 156, applications 158, virtual machines (VMs), and so forth. As an example of another attribute for a data source 114, the data source 114 may be associated with a particular host configuration 130. In this manner, such host configurations 130 may include a virtual server 134, a physical server 138, a storage array 142, and so forth.

The target system 164 includes target storage devices 174 (M example storage devices 174-1, 174-2, 174-3, . . . 174-M being depicted in FIG. 1), which have different properties, or attributes. As further described herein, these attributes may pertain to such attributes as a deduplication ratio, a compression ratio, a usage, a connection to an underlying physical storage device that stores the data, and so forth. As examples, as depicted in FIG. 1, the storage devices 174 may include a file library 174-1, a smart cache 174-2, a tape drive 174-3, and so forth.

In accordance with example implementations, the computer network 100 bucketizes, or classifies, each data source 114 as belonging to a respective storage category, or class. For example, in accordance with some implementations, the computer network 100 may classify each of the data sources 114 as belonging to one of the following three data source classes: a bronze class 116 (i.e., the lowest class from a performance demand perspective); a silver class 118 (i.e., the middle class from a performance demand perspective); or a gold class 120 (i.e., the highest performance demand class). For the example depicted in FIG. 1, the data source 114-1 has been classified by the computer network 100 as belonging to the gold class 120; the data source 114-2 has been classified by the computer network 100 as belonging to the silver class 118; the data source 114-3 has been classified by the computer network 100 as belonging to the bronze class 116; and the data source 114-N has been classified by the computer network 100 as belonging to the silver class 118.

In a similar manner, in accordance with example implementations, the computer network 100 classifies the storage devices 174 as belonging to one of a set of storage device classes: a bronze class 184 (i.e., the storage class having the lowest relative performance); a silver class 186 (i.e., the storage device class having the relative middle performance); and a gold class 188 (i.e., the storage device class having the relative highest performance).

In accordance with example implementations, the data protector 102 manages backup operations for the computer network 100. More specifically, in accordance with example implementations, the data protector 102 applies fuzzy logic to classify the storage devices 114 into the respective gold 120, silver 118 and bronze 116 classes by applying a user-defined weight schedule to attributes of the data sources 114 to determine composite weights and applying fuzzy logic to map the composite weights to the classes. Moreover, the data protector 102 may perform these classifications on an ongoing and dynamic basis at the time of the backup operations to reflect corresponding changes in attributes for a given data source 114. In accordance with example implementations, in a similar manner, the data protector 102 calculates composite weights for the storage devices 174 by applying a user-defined weight schedule to the attributes of the storage devices 174, and applies fuzzy logic to map the composite weights to the corresponding storage device classes. The data protector 102 may dynamically perform the classifications and re-classifications for the data sources 114 and storage devices 174 to account for changes in the attributes.

In addition to maintaining the classifications of the data sources 114 and storage devices 174, in accordance with example implementations, the data protector 102 manages the selection of a target storage device 174 for a given data source 114 at the time of the scheduled backup operation for the data source 114. For example, for the above-described data source classes of gold 120, silver 118 and bronze 116 and storage device classes of gold 188, silver 186 and bronze 184, then the data protector 102 may match the data source 114 to a target storage device of the same corresponding class. For example, if a data source 114 is grouped in a bronze class, the data protector 102 may select a corresponding storage device 174 that is grouped in a bronze storage device class.

The dynamic allocation of storage devices by the data protector 102 may have various advantages, such as, for example, the advantage of preventing problems due to an administrator not timely intervening to reschedule a backup for a failed or otherwise non-performing target storage device, or a storage device 174 that has been reclassified to another storage device class. Moreover, as described herein, the data protector 102 may, during each backup operation, reevaluate the classifications of the storage devices 174 to account for storage device usage. Therefore, as storage devices age, the constant reevaluation by the data protector 102 ensures that older storage devices 174 are automatically changed to lower tier classes.

In accordance with example implementations, the data protector 102 includes a cell manager 104, which, among its various functions, controls the grouping, or associating, of the data sources 114 into corresponding data source classes; grouping, or associating, the storage devices 174 into corresponding storage device classes; evaluating and re-evaluating the storage devices 174 during backup operations; selecting, or identifying, storage devices 174 to be used for backup operations based on class affiliations; and so forth.

In accordance with example implementations, the cell manager 104 may include one or multiple physical hardware processors 107, such as one or multiple central processing units (CPUs), one or multiple CPU cores, and so forth. Moreover, the cell manager 104 may include a memory 109. In general, the memory 109 is a non-transitory memory that may be formed from, as examples, semiconductor storage devices, phase change storage devices, magnetic storage devices, memristor-based devices, a combination of storage devices associated with multiple storage technologies, and so forth.

In accordance with some implementations, the memory 109 may store instructions, which may be executed by the processor(s) 107 to form one or multiple components of the cell manager 104, which are described herein. Moreover, the memory 109 may store various data (data pertaining to weight schedules for the storage device and/or data source attributes, fuzzy logic range values, storage device categories, data source classes, weights to assign to storage device attributes, weights to assign to data source attributes, and so forth).

In accordance with some implementations, one or more of the components of the cell manager 104 may be implemented in whole or in part by a hardware circuit that does not include a processor executing machine executable instructions. For example, in accordance with some implementations, one or more parts of the cell manager 104 may be formed in whole or in part by a hardware processor that does not execute machine executable instructions, such as, for example, a hardware processor that is formed from an application specific integrated circuit (ASIC), a field programmable gate array (FPGA), and so forth. Thus, many implementations are contemplated, which are within the scope of the appended claims.

In accordance with example implementations, the cell manager 104 may further include a metadata repository, or database 105. The database 105 stores metadata describing the associations of the storage devices 174 to their respective storage device categories and associations of the data sources 114 to their corresponding data source categories. In accordance with example implementations, as described herein, the association of the storage devices 174 to their respective storage device categories and the association of a data source to its data source category may be performed dynamically at the time of a backup operation. The database 105 may also store, as examples, metadata that represents attribute values for the storage devices 174 and data sources 114, weight schedules used to determine composite weights for the storage devices 174 and data sources 114 based on their attribute values, and so forth.

In accordance with example implementations, the data protector 102 may include components other than the cell manager 104. For example, in accordance with some implementations, the data protector 102 may include various input and output devices and may include, for example, a graphical user interface (GUI) 106 for purposes of allowing an administrator to view configurations by the data protector 102, modify backup policies, and so forth. In general, the data protector 102 may control the source system 110 through the disk agent 160 via a control flow 190; and the data protector 102 may control the target system 164 through the media agent 170 via a control flow 192. As also illustrated in FIG. 1, a backup flow 194 communicates the backup data between the disk agent 160 and the media agent 170 during a backup operation.

Figure 2:
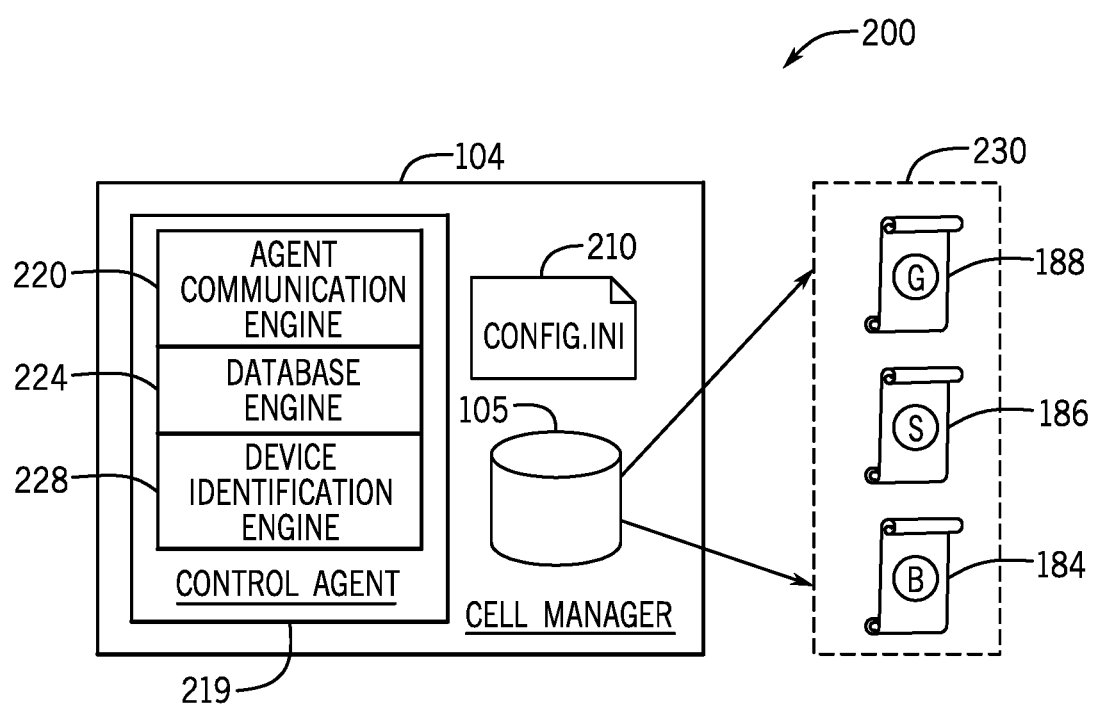
FIG. 2 is a schematic diagram of a cell manager of the computer network of FIG. 1 according to an example implementation.

Referring to FIG. 2, in accordance with some implementations, the cell manager 104 may include a control agent 219 that includes an agent communication engine 220. The agent communication engine 220 contains business logic for managing and controlling the disk agent 160 and the media agent 170 during backup and restoration processes. A database engine 224 of the control agent 219 communicates with the database 105 to store backup-related metadata, such as data describing attributes of the storage devices 174, data describing attributes of the data sources 114, data describing associations of the storage devices 174 with corresponding storage classes (as depicted at reference numeral 230), data associating the source devices 114 with corresponding data source classes, and so forth.

In accordance with example implementations, the control agent 219 may include a device identification engine 228, which reads a configuration file 210 (a config.ini file, for example) for purposes of retrieving backup configuration information pertaining to the computer network 100. For example, in accordance with some implementations, the device identification engine 228 reads the configuration file 210 to determine a source side storage policy, which details various attributes of the data sources 114 and to retrieve a user-defined weight schedule for assigning weights to attributes of the data sources 114, as further described herein. Moreover, in accordance with some implementations, the device identification engine 228 may read the configuration file 210 to determine properties, or attributes, of the storage devices 174 and to determine user-defined weight schedules used by the device identification engine 228 to assign weights to the attributes of the storage devices 174, as further described herein.

In accordance with some implementations, the device identification engine 228 follows the following steps to identify the appropriate target storage device 174 for a data source 114 for a backup operation. The device identification engine 228 may first, as an example, calculate composite weights for the storage devices 174 and the data sources 114 based on attributes of the storage devices 174 and data sources 114. Moreover, as further described herein, the calculation of the composite weights may be controlled by user-defined weight schedules. The device identification engine 228 may then apply fuzzy logic to the composite weights that are calculated for the storage devices 174 and the data sources 114; group the storage devices 174 into corresponding storage classes based on the application of the fuzzy logic; and group the source devices 114 into data source classes based on application of the fuzzy logic. Based on these classifications, the device identification engine 228 may then select the appropriate storage device(s) for a given backup operation based on the storage device class associated with the target storage device(s) and the data source class associated with the data source 114 for the backup operation.

More specifically, in accordance with example implementations, the device identification engine 228 matches, or maps, the data source to the corresponding target storage device(s) by selecting the target storage device(s) from the same class as the data source 114. The device identification engine 228 may then, once the storage device class is identified, select the appropriate target storage device or devices within that class using any of a number of criteria. In accordance with example implementations, the device identification engine 228 may use such criteria as the shortest local area network (LAN) path between the source and target (i.e., the LAN three approach), a round robin-based selection, a load balanced approach, and so forth. In accordance with example implementations, in connection with the backup operation, the device identification engine 228 updates the device properties, such as usage, and accordingly shuffles a given storage device 174 into another storage category, as appropriate.

Figure 3:
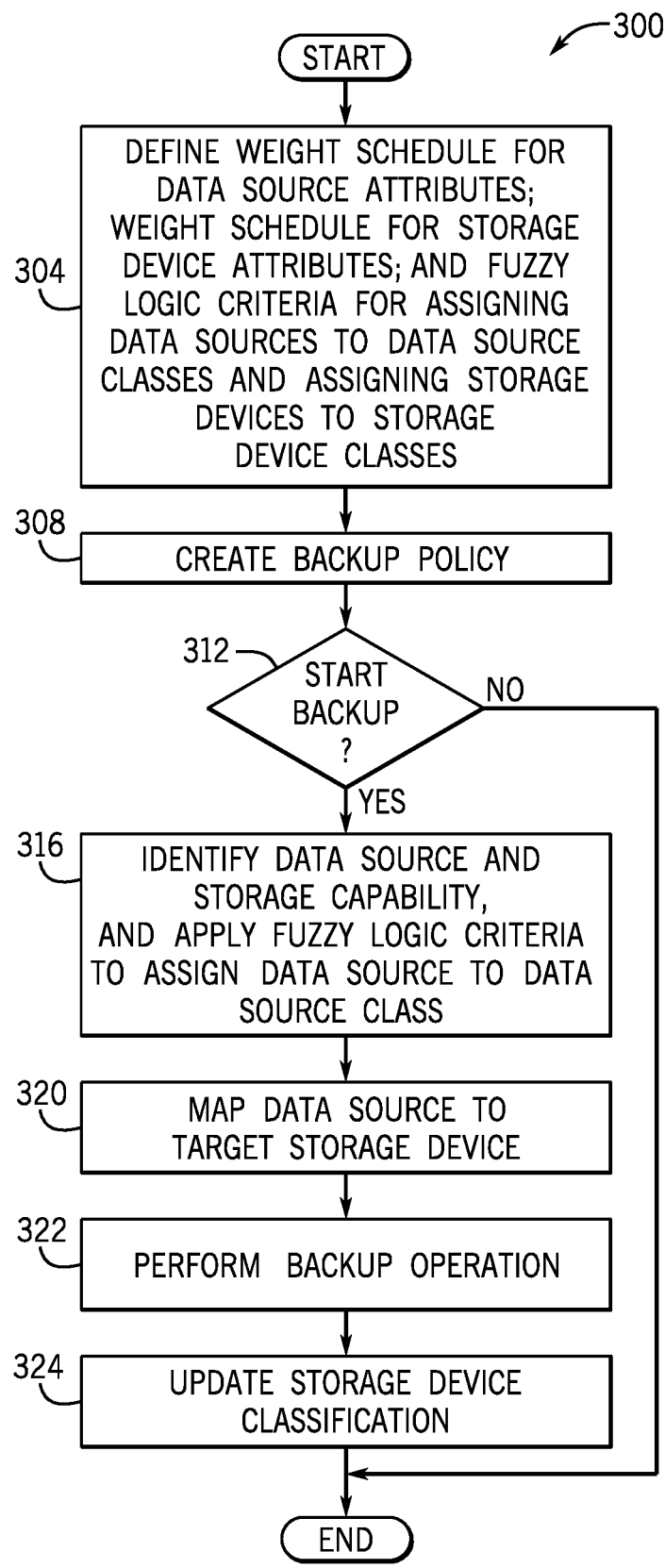
FIG. 3 is a flow diagram depicting a technique to backup data according to an example implementation.

Referring to FIG. 3, in general, in accordance with example implementations, the cell manager 104 may perform a workflow 300 to perform backup operations to backup data for the source devices 114. Referring to FIG. 3 in conjunction with FIGS. 1 and 2, pursuant to the workflow 300, a weight schedule is defined for data source attributes; and a weight schedule is defined for target storage device attributes. As discussed above, these weight schedules may be user-defined and may be provided by a configuration file, such as configuration file 210. Moreover, as depicted in block 304, the workflow 300 may include defining fuzzy logic criteria for assigning the data sources 114 to the data source classes and assigning the storage devices 174 to the storage device classes. In accordance with example implementations, for the data sources, the cell manager 104 may apply the fuzzy logic dynamically during the backup operation, as there could be changes, for example, to the data source with respect to such attributes as a data type, storage, new files added, and so forth. In accordance with some implementations, the older mapping may be stored in the metadata of the database 105. However, in accordance with further example implementations, the cell manager may dynamically check during the backup operation if there are any changes to the data source 114 and reapply fuzzy logic criteria thereto in the case that there are changes. Pursuant to block 308, the cell manager 104 creates a backup policy. As an example, the backup policy 308 may include backup schedules for backing up data from the data sources 114 and applying fuzzy logic criteria on the data sources 114. The backup schedules may further, as an example, assign the data sources 114 to respective data source classes and may specify a mapping, or association, of the storage devices 114 corresponding to storage device classes.

In accordance with further example implementations, the backup policy 308 may include backup schedules for backing up data from the data sources 114 and may include the previous mapping, or association, of the data sources 114 to respective data source classes and the previous mapping, or association, of the storage devices 174 that correspond to storage devices classes (which is dynamically updated during the backup operations).

FIG. 3 further illustrates actions taken by the cell manager 104 for a particular backup operation and illustrates the dynamic mapping, or association to a given data source 114 to a given target storage device 176 (or multiple target storage devices) at the time of the backup operation. In this manner, beginning at decision block 312, the cell manager determines whether a backup operation has started, and if so, controls transitions to block 316. In block 316, the cell manager 104 identifies the source data (i.e., identifies the particular data source 114) and the storage capability for storing the corresponding data and applies fuzzy logic criteria to assign data source 114 to a data source class; maps (block 320) the data source 114 to the target storage device 174; and updates (block 324) the target device attributes at the conclusion of the backup operation.

As a more specific example, in accordance with some implementations, the following attributes may be used for the storage device 174: a throughput; a deduplication ratio; a compression ratio and/or a usage. In general, the throughput represents the input/output operations per second (IOPS), or speed of the storage device expressed in IOPS. In general, the IOPS may range from a lower limit to an upper limit and vary based on the type of storage (i.e., varies depending on whether the storage device is a tape drive, is a solid state drive, is a magnetic storage device, and so forth).

The deduplication ratio refers to the ability of the storage device to eliminate redundant blocks during the backup process. If the storage device 174 supports deduplication, then weights may be assigned based on the deduplication ratio. In general, the deduplication ratio may vary from 0 (i.e., no deduplication) to 100.

The compression ratio, if compression is supported by the storage device 174, represents the degree by which the storage device 174 may compress data during the backup operation. The compression ratio may range from 0 (i.e., the storage 174 device does not support compression) to 100.

The usage pertains to the degree of wear on the storage device. In general, the greater the usage, the higher the corresponding value.

In accordance with example implementations, the configuration file 210 (see FIG. 2) defines the assignments of the weights to corresponding ranges of storage device attributes. For example, the configuration file 210 may define the weights for storage device attributes as follows:

TABLE 1

| Weight Assigned | IOPS | Deduplication | Compression Ratio | Usage |
|---|---|---|---|---|
| 2 | 1-2000 | 1-20 | 1-20 | >800 |
| 4 | 2001-4000 | 21-40 | 21-40 | 401-800 |
| 6 | 4001-6000 | 41-60 | 41-60 | 201-400 |
| 8 | 6001-8000 | 61-80 | 61-80 | 101-200 |
| 10 | >8000 | >81 | >81 | <200 |

In Table 1, a weight of "2" is assigned to an IOPS range of 1-2000, a deduplication ratio of 1 to 20, a compression ratio of 1 to 20, a usage greater than 800; a weight of "6" is assigned to an IOPS range of 4001 to 6000, a deduplication ratio of 41 to 60, and so forth. With the assigned weights, the device identification engine 228 determines (as further described below herein) a composite weight for a given storage device 174; and based on this composite weight, the device identification engine 228 assigns the storage device 174 to a particular storage device category. This assignment, in accordance with example implementations, is based on the application of fuzzy logic.

In general, "fuzzy logic" refers to many-valued logic in which, instead of assigning Boolean logic values (i.e., a true value or a false value) to the variable, multiple logic values may be assigned to the variable. Fuzzy logic is used, in accordance with example implementations, to map, or assign, the value for a variable to a particular continuous, real number range, in accordance with example implementations. In particular, as described herein, the device identification engine 228 assigns a storage device classification to a given storage device based on a fuzzy logic-based mapping between a composite weight value for the storage device (derived from the storage device's attributes) and a storage device class that corresponds to the composite weight value. In a similar manner, in accordance with example implementations, for a given data source, the device identification engine 228 applies fuzzy logic to map a composite weight derived from the data source's attributes to a corresponding data source class.

Figure 4:
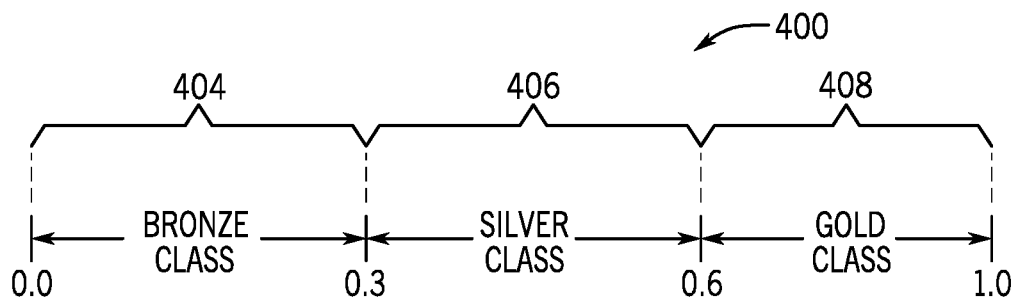
FIG. 4 is an illustration of fuzzy logic ranges and their associations with storage device classifications according to an example implementation.

As a more specific example, FIG. 4 is an illustration 400 of fuzzy logic ranges that may be used to define storage device classifications in accordance with implementations. As illustrated in FIG. 4, the first fuzzy logic values include a first fuzzy logic value range 404 between 0.0 and 0.3, which is associated with the bronze storage device class. In other words, if the composite weight for a given storage device 174 is within the fuzzy logic value range 404 (i.e. between 0.0 and 0.3), then the device identification engine 228 classifies, or associates, the storage device 174 as belonging to the bronze storage device class. A fuzzy value logic range 406 extends between the values of 0.3 to 0.6. Accordingly, if the composite weight for the storage device 174 falls within the range 406, then the device identification engine 228 associates the storage device 174 with the silver storage device class. FIG. 4 also depicts a fuzzy value logic range 408 from 0.6 to 1.0; and if the composite weight is in this range, then the device identification engine 228 classifies the storage device 174 as belonging to the gold storage device class.

In accordance with example implementations, the configuration file 210 (see FIG. 2) may define a weight schedule for attribute values, i.e., define how a particular weight is assigned to a particular range of attribute values. For example, in accordance with some implementations, the configuration file 210 may define the following weight schedule for data sources:

TABLE 2

| Weight Assigned | Data Type | Disk Type | Host Configuration |
|---|---|---|---|
| 5 | File System | Local | Standalone |
| 10 | Database | Storage Array | Cluster |
| 15 | Virtual Machine | Shared | Cluster + High Availability |

In Table 2, the weights that are assigned depend on (as examples), the data type associated with the data source, the disk type associated with the data source and the host configuration that is associated with the data source. In general, the "data type" refers to the category, or type, of source data, which may be, as examples, a file system, a database or a virtual machine. The "disk type" refers to the particular category, or type, of the source data. In this manner, the disk type may be, as examples, a local disk, a logical unit presented from a storage array (such as 3PAR array), or a network file system (NFS) that is shared from another host. The "host configuration" refers to how the data source is configured. In this manner, as examples, the data source may be a standalone host, a cluster, or a cluster with high availability. For the example weight assignments set forth above in Table 2, a weight of "5" is assigned to each of the following attributes: the data type being a file system, the disk type being a local disk, and the host configuration being a standalone configuration. Moreover, as another example, a weight of "15" is assigned to the disk type being a shared disk type; a weight of "10" is assigned to the host configuration being a cluster configuration; and so forth.

In accordance with example implementations, the device identification engine 228 may classify the data sources to their respective data source classes according to the fuzzy logic ranges illustrated in FIG. 4. For example, the device identification engine 228 may calculate a composite weight for a particular data source based on the attributes for the data source, and if, for example, the composite weight is 0.4, then the device identification engine 228 may assign the data source to the silver data storage class. However, in accordance with further implementations, the device identification engine 228 may use different fuzzy logic range values other than the ranges that are depicted in FIG. 4 to assign, or associate, the data sources to the bronze, silver and gold classes.

As a more specific example, in accordance with some implementations, the device identification engine 228 may classify a given storage device as follows. First, the device identification engine 228 may calculate a total weight for the storage device as follows:

$$(\Sigma_{i=1}^{n} \text{ Weight of device parameter})/\text{total weightage,} \qquad \text{Eq. 1}$$

In Eq. 1, the "total weightage" may be calculated as follows:

$$\Sigma_{i=1}^{n} \text{ Max weight of all parameters.} \qquad \text{Eq. 2}$$

For the specific example of the weight assignments of Table 1, the maximum weight for all four categories is "10," and accordingly, the total weightage is 10+10+10+10=40.

As a more specific example, a particular storage device may have the following user-defined weight schedule:

TABLE 3

| Device Property | Value | Weight |
| --- | --- | --- |
| IOPS | 8500 | 10 |
| Deduplication Ratio | 75 | 8 |
| Compression Ratio | 55 | 6 |
| Usage | 500 | 4 |

For this specific storage device, the device total weight may be calculated pursuant to Eq. 1 as follows: (10+8+6+4)/40=0.7. Given the fuzzy logic values and associated storage device classes defined in the example above (FIG. 4), the device identification engine 228 groups, or classifies, the storage device as belonging to the gold category (i.e., the device total weight of 0.7 is within the range of fuzzy values between 0.6 and 1.0).

In accordance with example implementations, the device identification engine 228 may calculate a total data weight, called the "source data weight," for a particular data source as follows:

$$(\Sigma_{i=1}^{n} \text{ weight of source data parameter})/\text{total weightage}, \qquad \text{Eq. 4}$$

In Eq. 4, the "total weightage" refers to the summation of maximum weights for the attribute categories. For the attribute categories defined above in Table 2, the maximum weight for the data type, disk type and host configuration is "15." Accordingly, the total weightage is 15+15+15=45.

As a more specific example, the data source may be a file system that is stored on a storage array for a standalone host, and may have the following attribute weights as set forth below:

TABLE 4

| Source Data | Weight |
| --- | --- |
| File System | 5 |
| Storage Array | 10 |
| Standalone | 5 |

For this example, the source data weightage is (5+10+5)/45=20/45=0.44. Due to the source data weightage of 0.44, the storage device classification engine 228 classifies the data source as belonging to the silver class. Accordingly, during backup, the device identification engine 228 matches the data source to a storage device in the silver category.

As another example, a particular data source may have the following attribute weights:

TABLE 5

| Source Data | Weight |
| --- | --- |
| Virtual Machine | 15 |
| Local Disk | 5 |
| Cluster | 10 |

For this example, the source data weightage is (15+5+10)/45=30/45=0.66. Accordingly, the data source is classified as belonging to the gold category, and accordingly, the device identification engine 228 maps a target storage device belonging to the gold category to the data source for backup.

Figure 5:
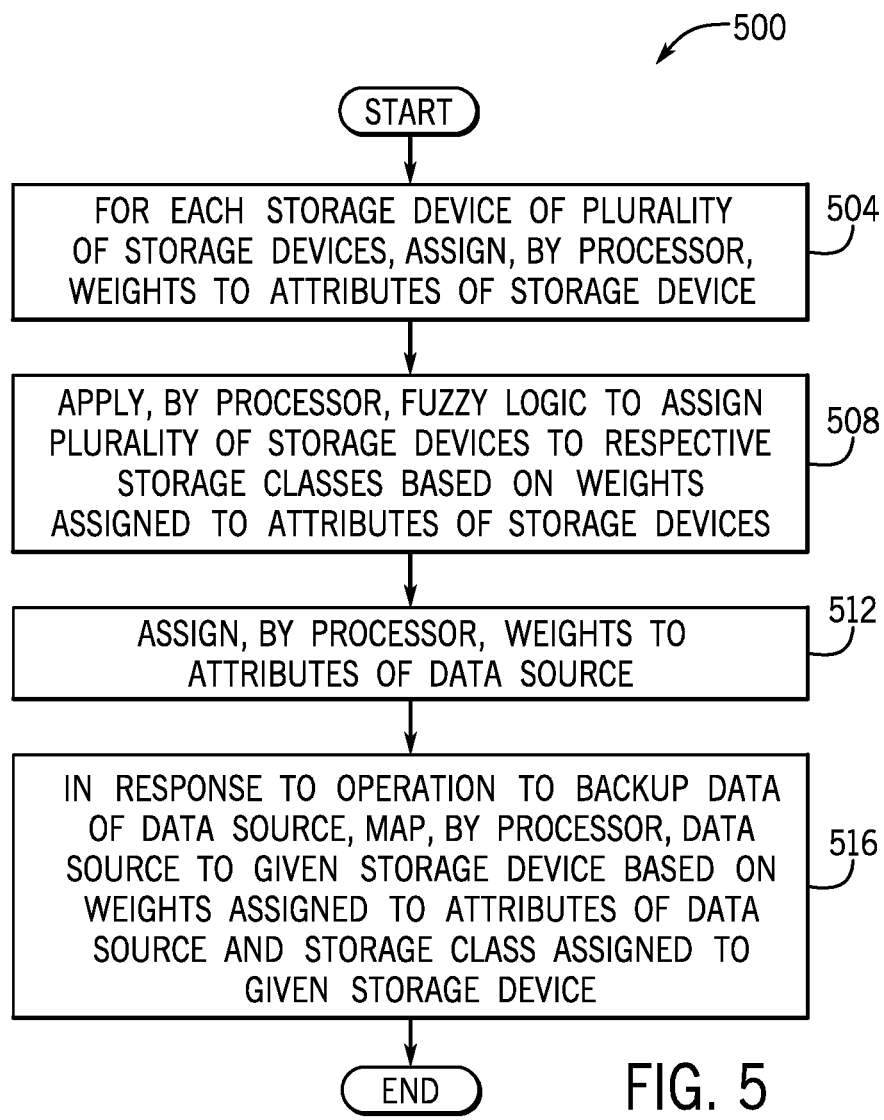
FIG. 5 is a flow diagram depicting a technique to apply fuzzy logic to map a data source to a storage device for a data backup operation according to an example implementation.

Thus, referring to FIG. 5, in accordance with example implementations, a technique 500 includes, for each storage device of a plurality of storage devices, assigning (block 504), by a processor, weights to attributes of the storage device; and applying (block 508), by the processor, fuzzy logic to assign the plurality of storage devices to respective storage categories based on the weights that are assigned to the plurality of storage devices. The technique 500 includes assigning (block 512), by the processor, fuzzy logic-based weights to attributes of a data source; and in response to an operation to backup data of the data source, mapping (block 516), by the processor, the data source to a given storage device based on the weights that are assigned to the attributes of the data source and the storage category that is associated with the given storage device.

Figure 6:
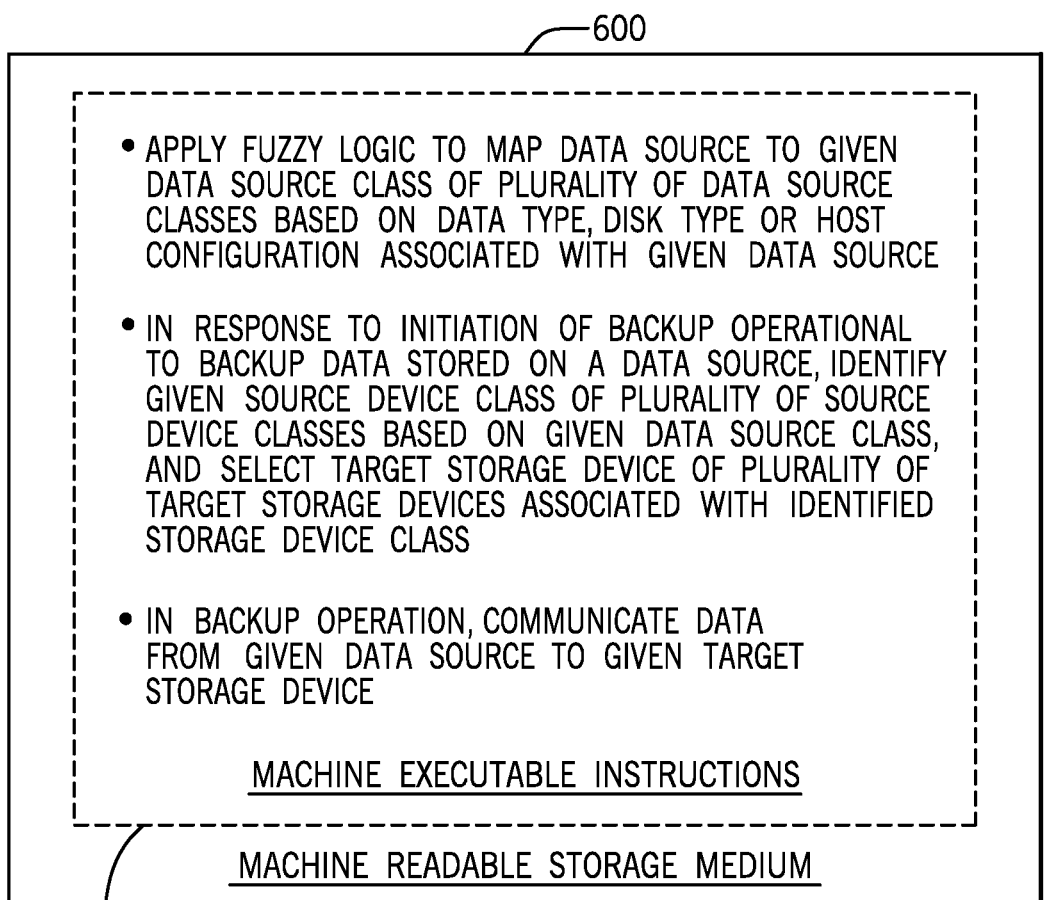
FIG. 6 is an illustration of machine executable instructions stored on a machine readable storage medium to apply fuzzy logic to select a target storage device for a data source for a backup operation according to an example implementation.

Referring to FIG. 6, in accordance with example implementations, a non-transitory machine readable storage medium 600 stores machine executable instructions 618 that, when executed by a machine, cause the machine to, in response to the initiation of a backup of data stored on a data source, apply fuzzy logic to map the data source to a given data source of a class of a plurality of data sources based on a data type, a disk type, or a host configuration associated with the given data source; identify a given source device class of a plurality of source devices classes based on the given data source class; and select a target source of a plurality of target source devices associated with the identified storage device class. The instructions, when executed by the machine, cause the machine to, in the backup operation, communicate data from the given data source to the given target source device.

Figure 7:
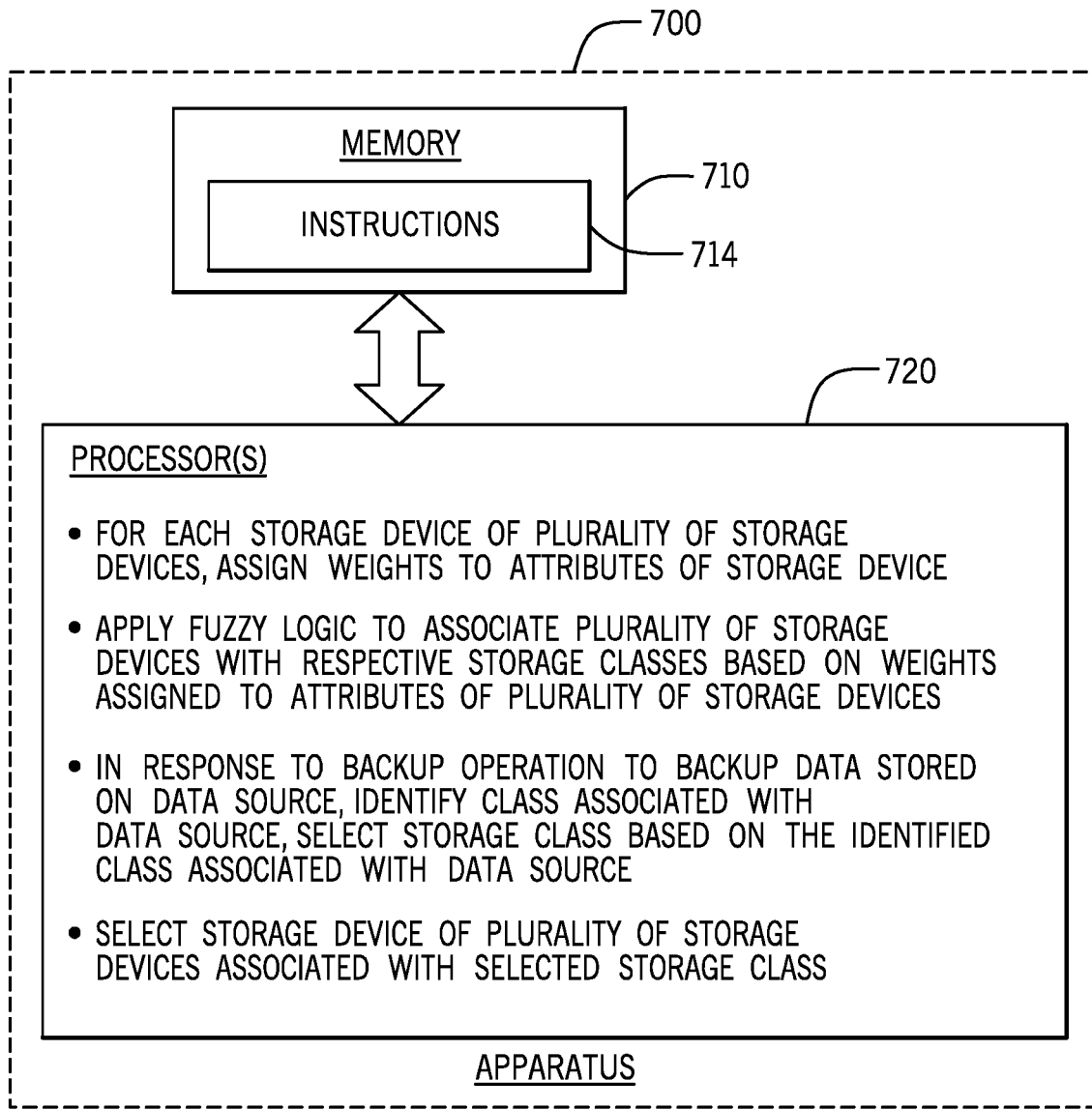
FIG. 7 is a schematic diagram of an apparatus illustrating instructions that, when executed by at least one processor, cause the processor(s) to apply fuzzy logic to select a storage device for a backup operation according to an example implementation.

Referring to FIG. 7, in accordance with example implementations, an apparatus 700 includes at least one processor 720 and a memory 710 to store instructions 714 that, when executed by the processor(s) 720, cause the processor(s) 720 to, for each storage device of a plurality of storage devices, assign weights to attributes of the storage device; and apply fuzzy logic to associate the plurality of storage devices with respective storage categories based on the weights that are assigned to the attributes of the plurality of storage devices. The instructions 714, when executed by the processor(s) 720, cause the processor(s) 720 to, in response to a backup operation to backup data stored on the data source, identify a category with the data source and select a storage category based on the identified category that is associated with the data source; and cause the processor(s) 720 to select a storage device of the plurality of storage devices associated with the selected storage category. The instructions 714, when executed by the processor(s) 720, cause the processor(s) 720 to, in response to an initiation of a backup operation to backup data that is stored on a given data source of the plurality of data sources, identify a given storage device class of the storage device categories based on the data source category that is associated with the given data source; and select a given storage device of the plurality of storage devices associated with the identified given storage device category for the backup operation.

While the present disclosure has been described with respect to a limited number of embodiments, those skilled in the art, having the benefit of this disclosure, will appreciate numerous modifications and variations therefrom. It is intended that the appended claims cover all such modifications and variations.

What is claimed is:

1. A method comprising:
for each storage device of a plurality of storage devices, assigning, by a processor, weights to attributes of the storage device;
applying, by the processor, fuzzy logic to assign the plurality of storage devices to respective storage classes based on the weights assigned to the attributes of the plurality of storage devices;
assigning, by the processor, weights to attributes of a data source; and
in response to an operation to backup data of the data source, mapping, by the processor, the data source to a given storage device of the plurality of storage devices based on the weights assigned to the attributes of the data source and the storage class associated with the given storage device.

2. The method of claim 1, wherein the attributes of the plurality of storage devices comprise at least one of a storage device throughput, a storage device deduplication ratio, a storage device compression ratio, or a storage device usage.

3. The method of claim 1, wherein applying fuzzy logic to assign the plurality of storage devices to respective storage classes comprises assigning the plurality of storage devices to the respective storage classes based on ranges for the weights assigned to the attributes of the plurality of storage devices.

4. The method of claim 1, further comprising:
for each storage device of the plurality of storage devices, determining a composite weight associated with the storage device based on the weights assigned to the attributes of the storage device,
wherein applying fuzzy logic to assign the plurality of storage devices to respective storage classes comprises, for each storage device of the plurality of storage devices, assigning the storage device to the respective storage class based on a range associated with the composite weight determined for the storage device.

5. The method of claim 1, further comprising:
applying, by the processor, fuzzy logic to assign the data source to a data source class based on the weights assigned to the attributes of the data source,
wherein the mapping of the data source to the given storage device comprises matching the data source class to the storage class associated with the given storage device.

6. The method of claim 1, wherein assigning weights to attributes of the data source comprises assigning a weight to at least one of a data type associated with the data source, a disk type associated with the data source, or a host configuration associated with the data source.

7. The method of claim 1, wherein mapping the data source to the given storage device comprises:
associating the data source with a given data source class of a plurality of data source classes; and
mapping the given data source class to a source device class associated with the given storage device.

8. The method of claim 7, wherein associating the data source with the given data source class comprises applying fuzzy logic to a composite weight derived from attributes of the data source and mapping the data source to the given data source class based on a fuzzy logic range of values for the composite weight.

9. The method of claim 1, wherein assigning weights to the attributes of the storage device comprises reading a configuration file defining the weights and associated ranges for the attributes of the storage device.

10. A non-transitory machine readable storage medium that stores instructions that, when executed by a machine, cause the machine to:
apply fuzzy logic to map a given data source to a given data source class of a plurality of data source classes based on a data type, a disk type or a host configuration associated with the given data source;
in response to initiation of a backup operation to backup data stored on a data source:
identify a given source device class of a plurality of source device classes based on the given data source class; and
select a target storage device of a plurality of target storage devices associated with the identified given source device class; and
in the backup operation, communicate data from the given data source to the selected target storage device.

11. The storage medium of claim 10, wherein the instructions, when executed by the machine, cause the machine to:
determine weights for attributes of the given data source;
determine a composite weight based on the determined weights for the attributes; and
apply fuzzy logic to the composite weight to associate the given data source to the given data source class.

12. The storage medium of claim 11, wherein the instructions, when executed by the machine, cause the machine to determine the weights for attributes of the given data source based on weight to attribute value ranges defined by a configuration file.

13. The storage medium of claim 10, wherein the instructions, when executed by the machine, cause the machine to:
determine weights for attributes of the selected target storage device, including determining a weight for at least one of the following attributes of the selected target storage device: a throughput of the selected target storage device, a deduplication ratio of the selected target storage device, a compression ratio of the selected target storage device, or a usage of the selected target storage device; and
combine the determined weights for the selected target storage device to determine a normalized composite weight for the selected target storage device; and
apply a fuzzy logic-based mapping to associate the selected target storage device to the identified given storage device class based on the normalized composite weight.

14. An apparatus comprising:
at least one processor; and
a memory to store instructions that, when executed by the at least one processor, cause the at least one processor to:
for each storage device of a plurality of storage devices, assign weights to attributes of the storage device;
apply fuzzy logic to associate the plurality of storage devices with respective storage categories based on the weights assigned to the attributes of the plurality of storage devices; and
in response to a backup operation to backup data stored on a data source, identify a category associated with the data source, select a storage category of the storage categories based on the identified category associated with the data source, and select a storage device of the plurality of storage devices associated with the selected storage category.

15. The apparatus of claim 14, wherein the instructions, when executed by the at least one processor, cause the at least one processor to:

assign weights to attributes of the data source; and
associate a plurality of data sources with the identified category based on the assigned weights.

16. The apparatus of claim 14, wherein the instructions, when executed by the at least one processor, cause the at least one processor to, for at least one storage device of the plurality of storage devices:
   determine a weight for each attribute of the storage device;
   determine a composite weight for the storage device based on a summation of the determined weights for the attributes for the storage device; and
   associate the storage device with a respective storage category of the respective storage categories based on the determined composite weight.

17. The apparatus of claim 14, wherein the attributes of the plurality of storage devices comprise at least one of a storage device throughput, a storage device deduplication ratio, a storage device compression ratio, or a storage device usage.

18. The apparatus of claim 14, wherein the instructions, when executed by the at least one processor, cause the at least one processor to, in response to conclusion of the backup operation:
   update the attributes of the plurality of storage devices;
   associate the plurality of storage devices with respective storage categories based on weights assigned to the updated attributes.

19. The apparatus of claim 14, wherein the attributes of the plurality of storage devices comprise attributes associated with usage, and the instructions, when executed by the at least one processor cause the at least one processor to update the attributes associated with usage at conclusion of the backup operation.

20. The apparatus of claim 14, wherein the instructions, when executed by the at least one processor, cause the at least one processor to assign the weights to the plurality of storage devices based on weight to attribute value ranges defined by a configuration file.

* * * * *